United States Patent [19]

Shimazu et al.

[11] Patent Number: 5,706,915
[45] Date of Patent: Jan. 13, 1998

[54] BRAKE DISC ROTOR

[75] Inventors: Takashi Shimazu; Haruo Katagiri, both of Aichi-ken; Shigeru Sakamoto; Hidetoshi Shimizu, both of Shizuoka-ken, all of Japan

[73] Assignees: Kabushiki Kaisha Toyota Chuo Kenkyusho, Aichi-ken; Toyota Jidosha Kabushiki Kaisha, Toyota, both of Japan

[21] Appl. No.: 715,491

[22] Filed: Sep. 18, 1996

Related U.S. Application Data

[63] Continuation of Ser. No. 523,964, Sep. 6, 1995, abandoned.

[30] Foreign Application Priority Data

Sep. 8, 1994 [JP] Japan ................... 6-242212

[51] Int. Cl.$^6$ ................................................ F16D 65/12
[52] U.S. Cl. .......................... 188/71.6; 188/264 AA; 188/218 XL; 192/113.21
[58] Field of Search .......................... 188/71.6, 218 R, 188/218 XL, 264 R, 264 A, 264 AA; 192/70.12, 113.1, 113.2, 113.21, 113.23

[56] References Cited

U.S. PATENT DOCUMENTS

| | | |
|---|---|---|
| 3,892,297 | 7/1975 | Brownyer. |
| 4,013,146 | 3/1977 | Gebhardt et al. ............ 188/71.6 |
| 4,469,203 | 9/1984 | Herbulot et al. ............ 188/218 XL |
| 4,865,167 | 9/1989 | Giorgetti et al. ............ 188/218 XL |
| 4,928,798 | 5/1990 | Watson et al. ............ 188/218 XL |
| 5,427,212 | 6/1995 | Shimazu et al. ............ 188/218 XL |

FOREIGN PATENT DOCUMENTS

| | | |
|---|---|---|
| 35 39 640 | 10/1986 | Germany. |
| 3539 640 C1 | 10/1986 | Germany. |
| 56-18130 | 2/1981 | Japan. |
| 1-58779 | 12/1989 | Japan. |
| 5-346127 | 12/1993 | Japan. |
| 2 057 609 | 4/1981 | United Kingdom. |

OTHER PUBLICATIONS

Patent Abstracts of Japan, vol. 8, No. 83, Apr. 17, 1984, JP–A 59–1825, Jan. 7, 1984.

Primary Examiner—Josie Ballato
Attorney, Agent, or Firm—Oblon, Spivak, McClelland, Maier & Neustadt, P.C.

[57] ABSTRACT

A brake disc rotor includes: a pair of disc-shaped sliding plates provided in parallel with and separately from each other in the axle direction; a plurality of partition walls radially provided between the sliding plates; a plurality of passages radially formed between the plurality of partition walls; a plurality of inlet and outlet openings communicating with the plurality of passages and opening inward and in the radially outward direction; and an inclined portion formed on the surface of the inside sliding plate opposed to the outside sliding plate such that a distance between the inside and outside sliding plates is gradually decreased in the radially outward direction.

23 Claims, 16 Drawing Sheets

F I G. 2
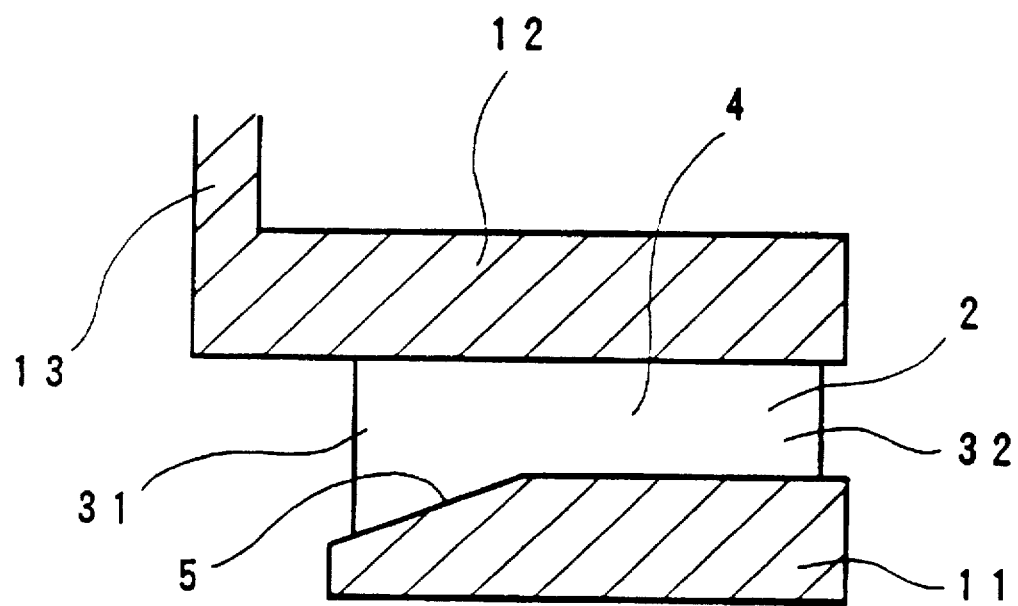

CROSS-SECTIONAL AREA IN VENTILATION HOLE

PERFORMANCE OF FLOW RATE

F I G. 7
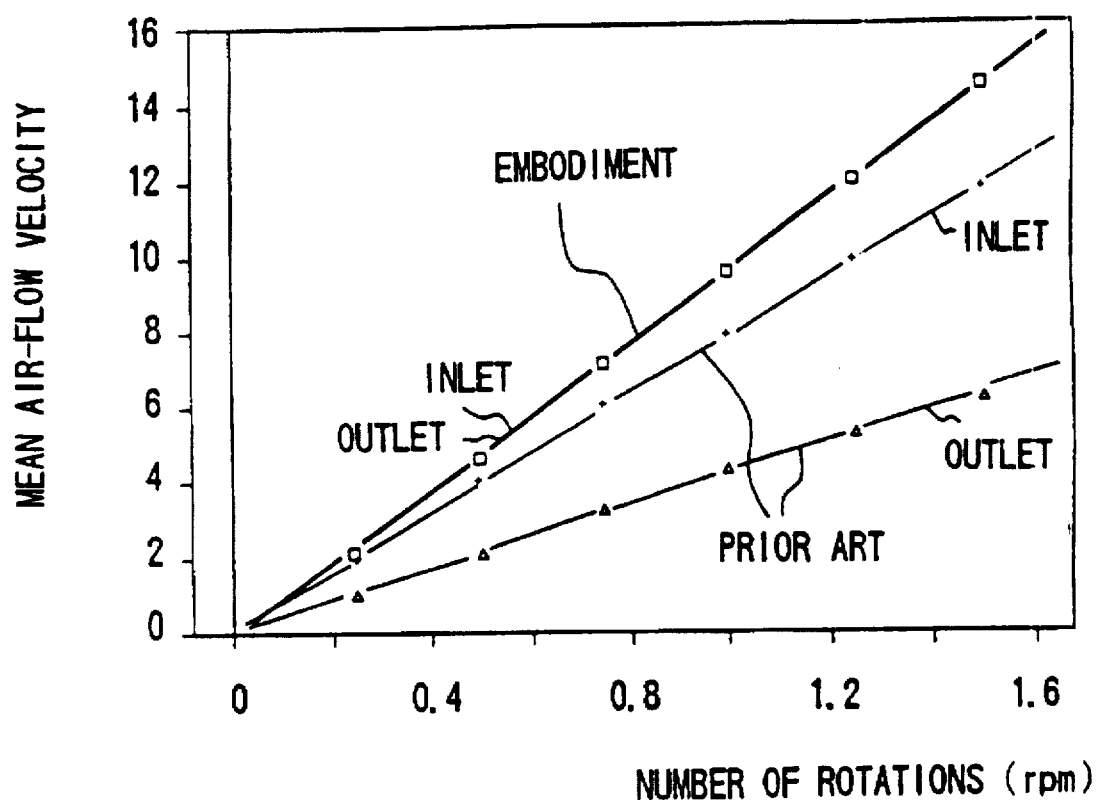
MEAN AIR-FLOW VELOCITY IN SECTION OF INLET AND OUTLET

MEAN AIR-FLOW VELOCITY IN SECTION (250, 500, 750rpm)

MEAN AIR-FLOW VELOCITY IN SECTION (1000, 1250, 1500rpm)

COOLING CAPACITY OF ROTOR

RATE IN COOLING CAPACITY OF ROTOR

HEAT TRANSFER COEFFICIENT OF ROTOR

RATE IN HEAT TRANSFER COEFFICIENT OF ROTOR

F I G. 1 5
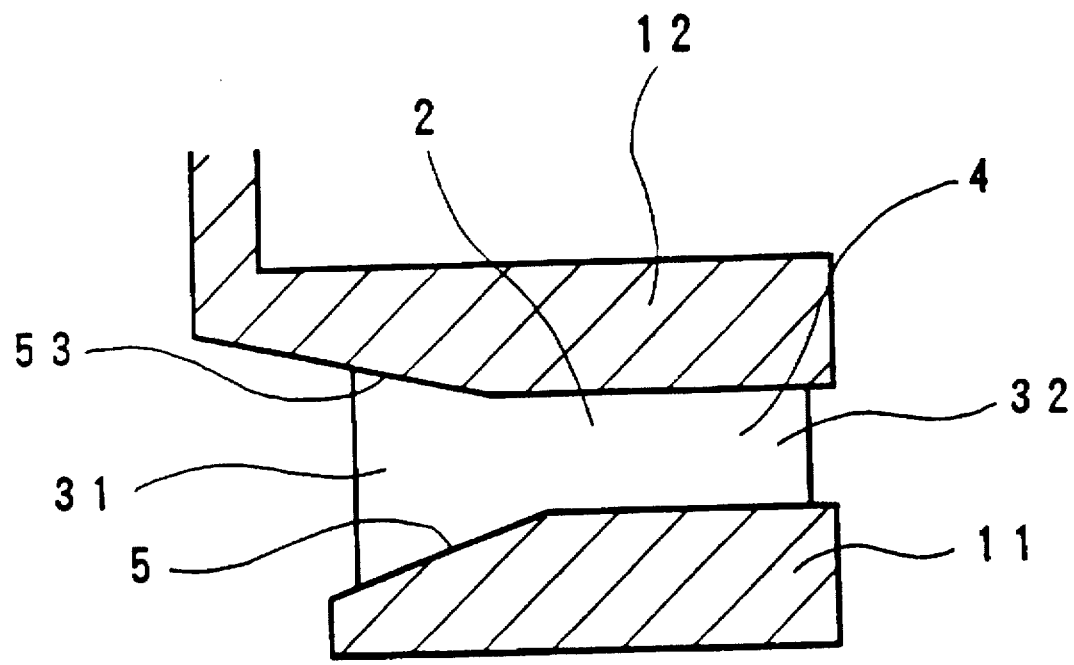

(a)

(b)

(c)

F I G. 1 7  (PRIOR ART)
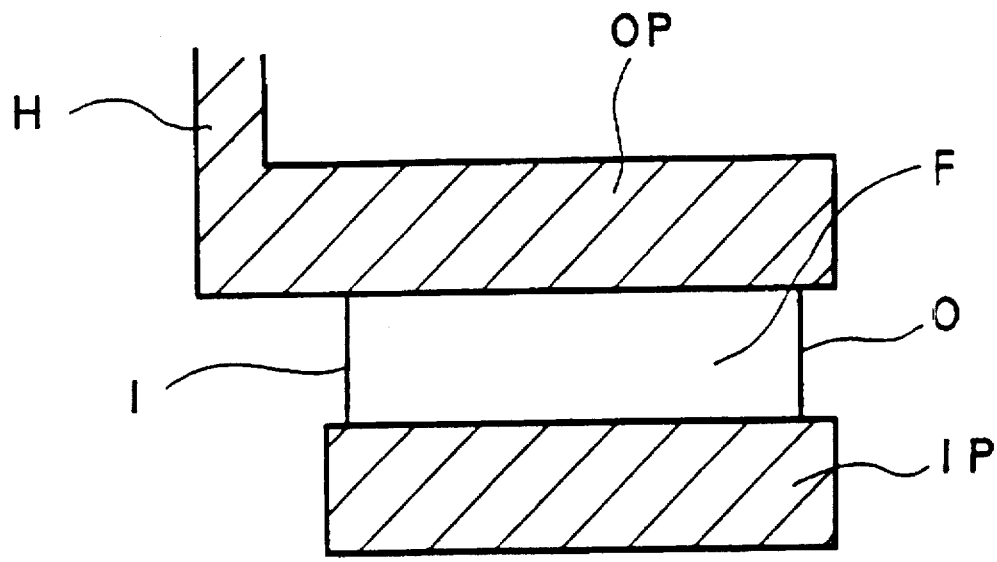
F I G. 1 8  (PRIOR ART)
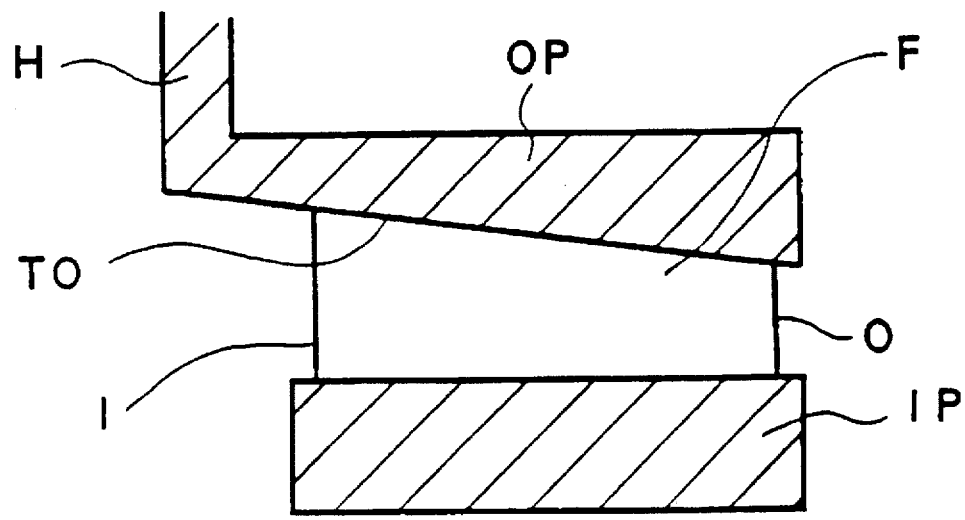

BRAKE DISC ROTOR

This application is a continuation of application Ser. No. 08/523,964, filed on Sep. 6, 1995, now abandoned.

BACKGROUND OF THE INVENTION

1. Field of the Invention

This invention relates to a brake disc rotor of a disc brake device used in a vehicle or the like.

2. Description of the Related Art

As shown in FIGS. 17 to 20, a brake disc rotor of the prior art includes disc-shaped sliding plates OP and IP on the outside and inside both provided separately from each other in the axial direction, and a plurality of partition walls F radially formed between the outside and inside sliding plates to form inlet openings I, outlet openings O and radial passages H between the partition walls, respectively. The brake disc rotor of the prior art has been constituted such that the distance between the opposed surfaces of the disc-shaped sliding plates OP and IP on the outside and inside is held constant in the radial direction (FIG. 17), or the surface of the outside sliding plate OP opposed to the inside sliding plate IP is formed into a taper surface TO (FIG. 18), or the opposed surfaces of the outside and inside sliding plates OP and IP are formed into taper surfaces TO and TI (FIG. 19), or the opposed surfaces of the outside and inside sliding plates OP and IP are formed into arc-shaped surfaces CO and CI (FIG. 20).

In the brake disc rotor of the prior art (JULP56-139034 and JULP56-139035); shown in FIG. 17, the distance between the opposed surfaces of the disc-shaped sliding plates OP and IP on the outside and inside is held constant in the radial direction, and the plurality of partition walls F are radially formed between the outside and inside sliding plates OP and IP. Thus, this prior art brake disc rotor has disadvantages in that the area of the inlet opening I is narrowed to increase the inflow resistance, and the more the stream reaches the outer side, the more the mean flow rate is reduced to lower the heat transfer coefficient.

In the brake disc rotor of the prior art JPLP56-18130; shown in FIG. 18, the surface of the outside sliding plate OP opposed to the inside sliding plate IP is wholly formed into the taper surface TO. This prior art brake disc rotor has disadvantages in that thermal deformation is caused by the reduction of rigidity and strength of a connection portion between the outside sliding plate OP and a hub H, and the distribution of temperature in the radial direction is increased due to the difference in thickness of the outside sliding plate OP, while increase in size should be required to ensure the set weight of the rotor.

In the brake disc rotor of the prior art JULP57-6832 and JULP57-80736 shown in FIG. 19, the opposed surfaces of the outside and inside sliding plates OP and IP are wholly formed into the taper surfaces TO and TI. Thus, this prior art brake disc rotor has disadvantages in that thermal deformation is caused by the reduction of rigidity and strength of a connection portion between the outside sliding plate OP and a hub H, and the distribution of temperature in the radial direction is increased due to the difference in thickness of the outside and inside sliding plates OP and IP, while increase in size should be required to ensure the set weight of the rotor.

In the brake disc rotor of the prior art (DE3539-640-C) shown in FIG. 20, the opposed surfaces of the outside and inside sliding plates OP and IP are wholly formed into the arc-shaped surfaces CO and CI, and the plurality of partition walls F are radially formed between the outside and inside sliding plates OP and IP. Thus, this prior art brake disc rotor has disadvantages in that since the sectional area of a ventilation hole defined between the partition walls F on the outer side is abruptly enlarged, the pressure resistance is increased to reduce the flow rate, thermal deformation is caused by the reduction of rigidity and strength of a connection portion between the outside sliding plate OP and a hub H, and the distribution of temperature in the radial direction is increased due to the difference in thickness of the outside and inside sliding plates OP and IP, while increase in size should be required to ensure the set weight of the rotor.

SUMMARY OF THE INVENTION

It is an object of the present invention to provide a brake disc rotor which is based on a first technical idea of the present invention that a taper portion is formed on a surface of an inside sliding plate opposed to an outside sliding plate such that an opposed interval between an outside and inside sliding plates is gradually decreased according as the outside and inside sliding plates come outward in the radial direction.

Another object of the present invention is to provide a brake disc rotor which is based on a second technical idea of the present invention that a taper portion is formed on an inner surface of an inside sliding plate opposed to an outside sliding plate, and a distance between an opposed inner surfaces of the inside and outside sliding plates is approximately constant.

A further object of the present invention is to provide a brake disc rotor which enlarges an area of an inlet opening to reduce the inflow resistance, and eliminates the thermal deformation caused by the reduction of rigidity and strength of a connection portion between the outside sliding plate and a hub.

A still further object of the present invention is to provide a brake disc rotor which prevents the increase of the distribution of temperature in the radial direction due to the difference in thickness of the outside sliding plate, and dispenses with any increase in size required for ensuring the set weight of the rotor.

A yet further object of the present invention is to provide a brake disc rotor which prevents the increase of a pressure resistance and the reduction of a flow rate by preventing the abrupt increase of the sectional area of a ventilation hole defined between the partition walls on the outer side.

A yet further object of the present invention is to provide a brake disc rotor comprising a pair of inside and outside disc-shaped sliding plates provided axially inside and outside on the brake disc rotor, the inside and outside sliding plates being in parallel with and separately from each other in the axial direction; a plurality of partition walls radially provided between the inside and outside sliding plates; a plurality of passages radially formed between the plurality of partition walls; a plurality of inlet and outlet openings communicating with the plurality of passages and opening inward and outward in the radial direction; and an inclined portion formed on the surface of the inside sliding plate opposed to the outside sliding plate such that a distance between the inside and outside sliding plates is gradually decreased in the radially outward direction.

Another object of the present invention is to provide a brake disc rotor wherein the inside sliding plate has radially inner and outer surface portions opposed to the outside sliding plate, and the inclined portion comprises a taper portion formed on at least the inner surface portion of the inside sliding plate so that a thickness of the inside sliding plate is gradually increased in the radially outward direction.

A further object of the present invention is to provide a brake disc rotor wherein the inside and outside sliding plates have radially inner and outer surface portions, and a distance between the opposed outer surface portions of the inside and outside sliding plates is approximately constant.

A still further object of the present invention is to provide a brake disc rotor wherein the inclined portion comprises the taper portion formed over the whole radial length of the surface of the inside sliding plate.

A yet further object of the present invention is to provide a brake disc rotor further comprising a taper portion formed on the inner surface portion of the outside sliding plate opposed to the inside sliding plate so that a thickness of the outside sliding plate is gradually increased in the radially outward direction.

According to the present invention, a brake disc rotor has an inclined portion formed on the surface of the inside sliding plate opposed to the outside sliding plate such that the opposed interval between the inside and outside sliding plates is gradually decreased in the radially outward direction. Thus, the stream having flown from each large inlet opening flows out of each outlet opening by passing through the passages comprising ventilation holes, which has a small change in sectional area and is defined by the mutually adjacent partition walls provided radially and the opposed surfaces of the outside sliding plate and the inside sliding plate formed with the inclined portion.

According to the present invention, it is preferable to provide a brake disc rotor wherein the inclined portion comprises a taper portion formed on at least the radially inner surface portion of the inside sliding plate opposed to the outside sliding plate. Thus, the stream having flown from each large inlet opening flows out of each outlet opening by passing through the ventilation hole, which has a small change in sectional area and is defined by the mutually adjacent partition walls provided radially and the opposed radially inner surfaces of the outside sliding plate and the inside sliding plate, and also through the ventilation hole on the outer side, which has no change in opposed interval between the outside and inside sliding plates.

According to the present invention, it is further preferable to provide a brake disc rotor wherein the inclined portion comprises the taper portion formed over the whole radial length of the surface of the inside sliding plate opposed to the outside sliding plate. Thus, the stream having flown from each large inlet opening flows out of each outlet opening by passing through the ventilation hole, which has a small change in sectional area and is defined by the mutually adjacent partition walls provided radially and the opposed surfaces of the outside sliding plate and the inside sliding plate wholly formed with the taper portion.

According to the present invention, it is further preferable to provide a brake disc rotor wherein the taper portions are respectively formed on the opposed inner surface portions of the inside and outside sliding plates. Thus, the stream having flown from each large inlet opening flows out of each outlet opening by passing through the ventilation hole, which has a small change in sectional area and is defined by the mutually adjacent partition walls provided radially and the opposed inner surface portions of the outside and inside sliding plates respectively formed with the taper portions, and also through a ventilation hole on the outer side, which has no change in opposed interval between the outside and inside sliding plates.

Since the inclined portion is formed on the inside sliding plate such that the opposed interval between the outside and inside sliding plates is gradually decreased in the radially outward direction, the area of the inlet opening is enlarged to reduce the inflow resistance. Thus, the brake disc rotor of the present invention exerts such effects as to improve cooling capacity by increasing flow rate and to eliminate the thermal deformation caused by the reduction of rigidity and strength of a connection portion between the outside sliding plate and a hub, while preventing the increase of the distribution of temperature in the radial direction due to the difference in thickness of the outside sliding plate, since no inclined portion is formed on the outside sliding plate.

Since the taper portion is formed on the inner side of the inside sliding plate such that the opposed interval between the inside and outside sliding plates is gradually decreased in the radially outward direction, the area of the inlet opening is enlarged to reduce the inflow resistance. Thus, the brake disc rotor of the present invention exerts such effects as to improve the cooling capacity by increasing flow rate and to eliminate the thermal deformation caused by the reduction of rigidity and strength of a connection portion between the outside sliding plate and the hub, while preventing the increase of the distribution of temperature in the radial direction due to the difference in thickness of the outside sliding plate, since no inclined portion is formed on the outside sliding plate.

Since the taper portion is formed wholly on the inside sliding plate such that the opposed interval between the inside and outside sliding plates is gradually decreased in the radially outward direction, the area of the inlet opening is enlarged to reduce the inflow resistance. Thus, the brake disc rotor of the present invention exerts such effects as to improve the cooling capacity by increasing flow rate and to prevent the increase of a pressure resistance and the reduction of a flow rate by preventing the abrupt increase of the sectional area of the ventilation hole, since the area of each ventilation hole is made uniform even though the mutually adjacent partition walls are provided radially.

Since the taper portions are formed on the inner side of the inside and outside sliding plates such that the opposed interval between the inside and outside sliding plates is gradually decreased in the radially outward direction, the area of the inlet opening is enlarged to reduce the inflow resistance. Thus, the brake disc rotor of the present invention exerts such effects as to improve the cooling capacity by increasing flow rate and to control the increase of the distribution of temperature in the radial direction due to the difference in thickness of the inside and outside sliding plates, since a change in thickness of the taper portions formed on the inside and outside sliding plates can be lessened.

BRIEF DESCRIPTION OF THE DRAWINGS

The foregoing and other objects and features of the present invention will become apparent from the following description of preferred embodiments of the invention with reference to the accompanying drawings, in which:

FIGS. 1A and 1B respectively show side and plan views of the flow velocity distribution in the ventilation holes of FIG. 1a;

FIG. 2 is a longitudinal sectional view showing an essential portion of the brake disc rotor as the first preferred embodiment;

FIG. 7 is a graph showing the mean air-flow velocity in section of an inlet and an outlet according to the first preferred embodiment and the prior art;

FIG. 15 is a longitudinal sectional view showing an essential portion of a brake disc rotor as a third preferred embodiment of the present invention;

FIG. 17 is a longitudinal sectional view showing an essential portion of a brake disc rotor as a first prior art;

FIG. 18 is a longitudinal sectional view showing an essential portion of a brake disc rotor as a second prior art;

DETAILED DESCRIPTION OF THE PREFERRED EMBODIMENTS

Figure 3:
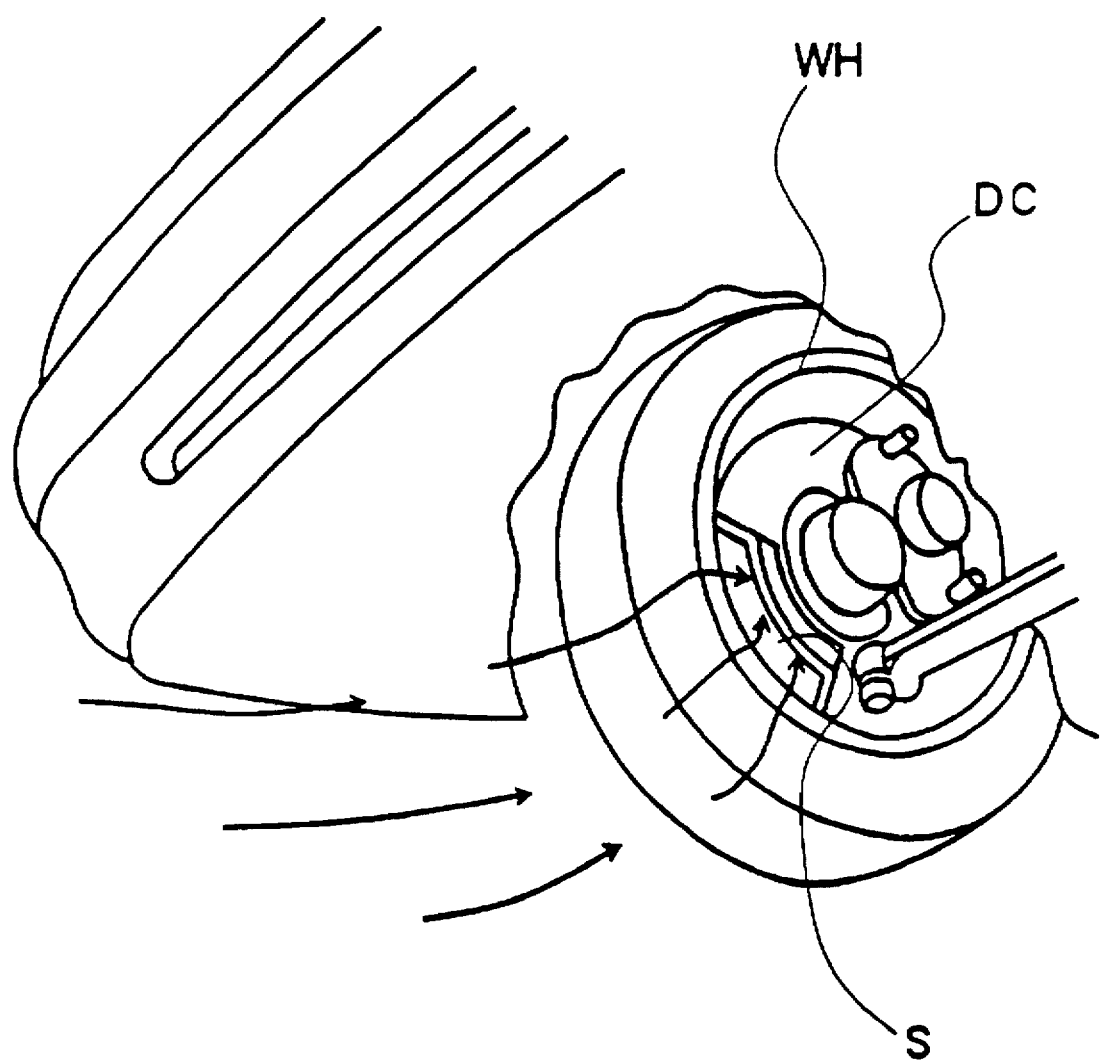
FIG. 3 is a perspective view, partly broken-away, showing a condition that the brake disc rotor as the first preferred embodiment is loaded on a vehicle.
Figure 4:
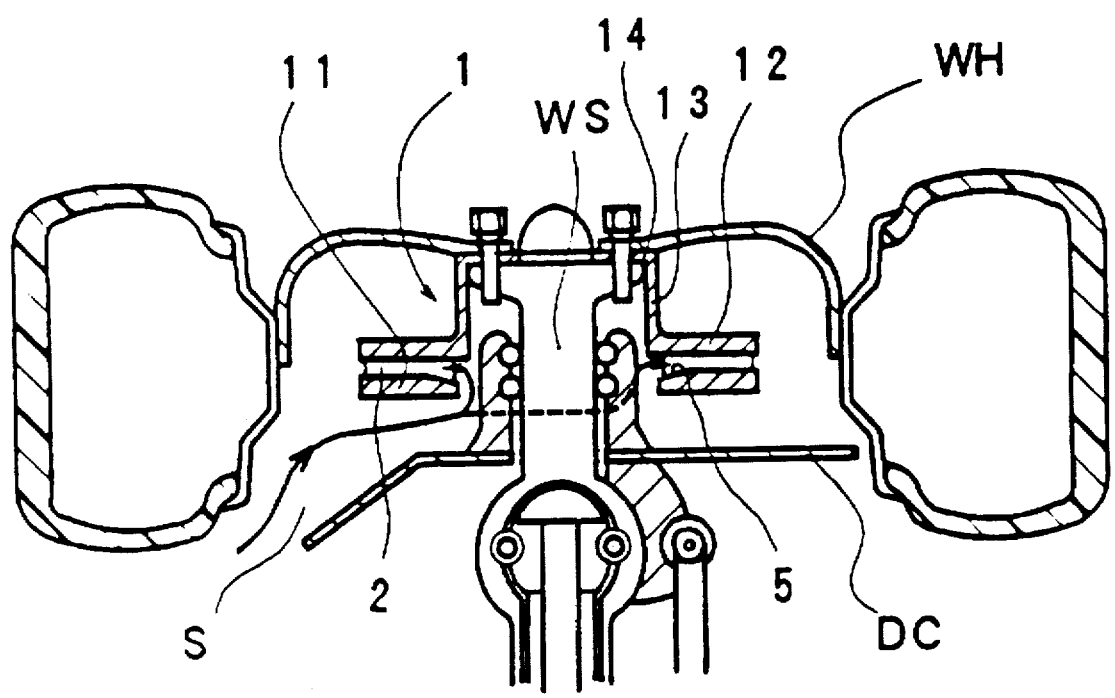
FIG. 4 is a sectional view showing the condition that the brake disc rotor as the first preferred embodiment together with a wheel is fixed to an axle.

A brake disc rotor as a first preferred embodiment is applied to a disc brake device for use in an automobile, and introduces air, which is sucked from a suction port S formed between a dust cover DC and a wheel WH, into a ventilation hole of a rotor as shown in FIGS. 3 and 4. A description of the brake disc rotor as the first preferred embodiment will be given in detail with reference to FIGS. 1 to 13.

As shown in FIGS. 1 to 4, a brake disc rotor 1 as the first preferred embodiment comprises inside and outside sliding plates 11 and 12 provided in parallel with and separately from each other in the axial direction of an axle (not shown), a plurality of fins 2 comprising partition walls arranged radially between the sliding plates 11 and 12, a plurality of inlet and outlet openings 31 and 32 respectively opening inward and outward in the radial direction between the sliding plates 11 and 12, a plurality of ventilation holes 4 comprising a passage defined by the sliding plates 11 and 12 and the mutually adjacent partition walls 2, and a taper portion 5 formed on the radially inner surface portion of the inside sliding plate opposed to the outside sliding plate in a manner that a thickness of the inside sliding plate is gradually increased in the radially outward direction.

Figure 1:
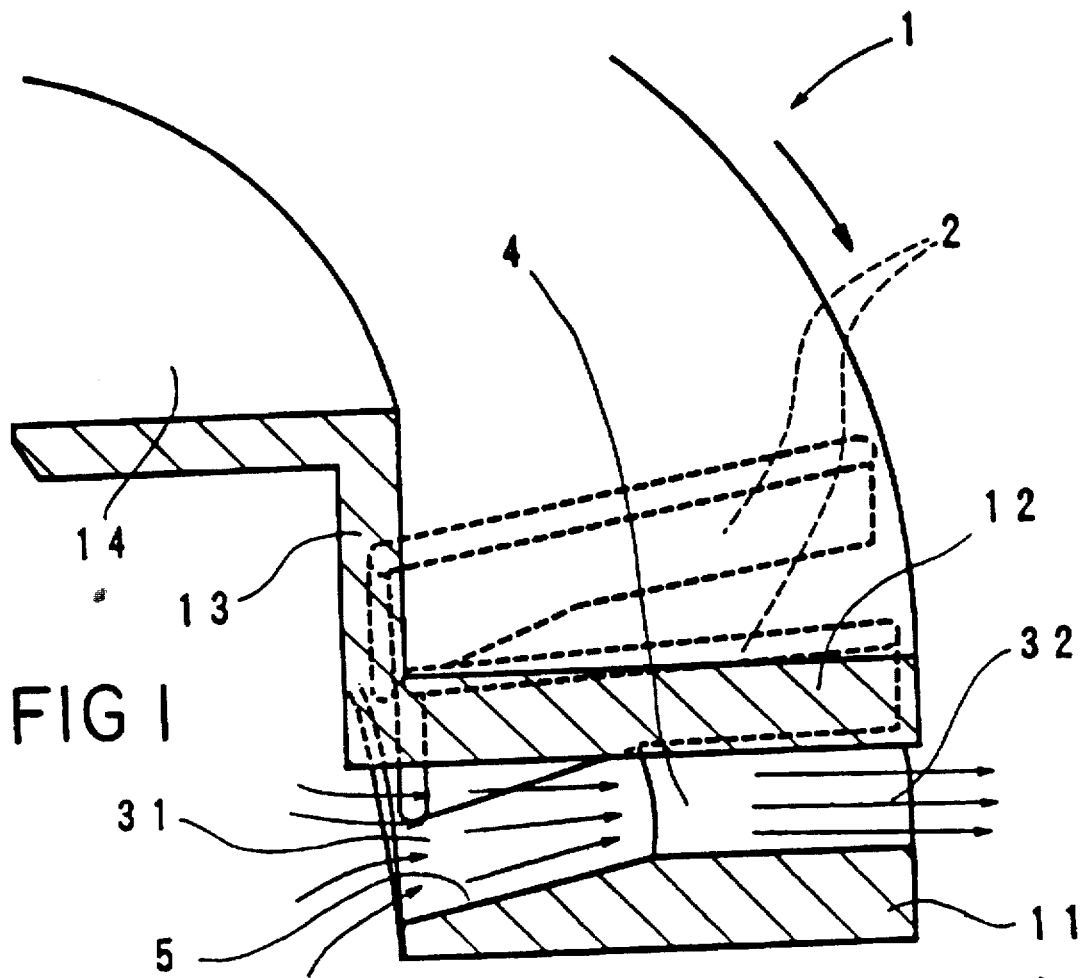
FIG. 1 is a perspective view, partly broken-away, showing a brake disc rotor as a first preferred embodiment of the present invention.
Figure 1A:
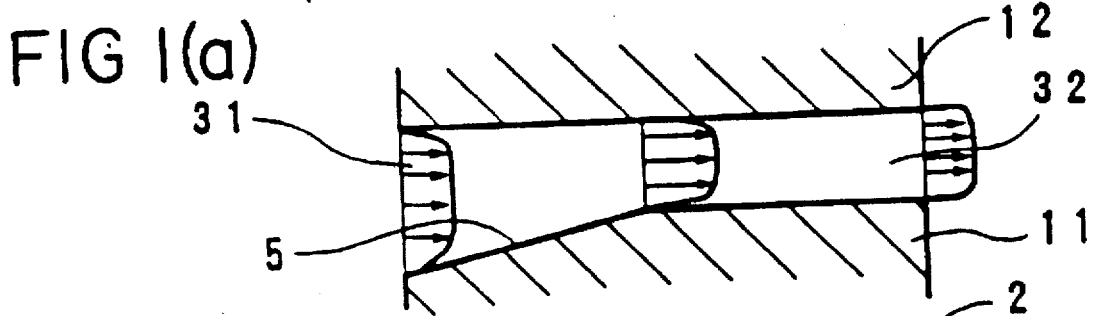
Figure 1B:
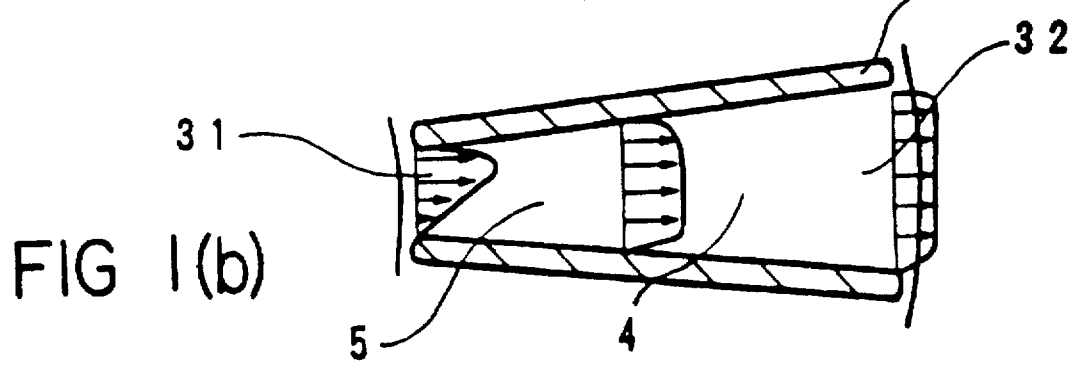

As shown in FIGS. 1 and 2, the outside sliding plate 12 is provided integrally with a boss portion 14 comprising a wheel fixing portion through a step portion 13 together with the inside sliding plate 11. The outside sliding plate 12 is 275 mm in outer diameter, and 165 mm in inner diameter, and formed in the same thickness of 10 mm throughout in the radial direction.

As shown in FIGS. 1 and 2, the inside sliding plate 11 is provided to face to the outside sliding plate 12, and is 275 mm in outer diameter and 165 mm in inner diameter. Further, the inside sliding plate 11 has a taper portion 5 as an inclined portion which linearly increases in thickness in the radially outward direction to linearly reduce the height of the ventilation hole 4 in the axial direction. The taper portion 5 extends over 25 mm in length, i.e. the length from 82.5 to 107.5 mm in radius corresponding to the range of 45% in the whole ventilation hole on the inner side. Thus, the taper portion 5 prevents the increase of a pressure resistance due to an extreme change in sectional area of the taper portion, and reduces the sectional area smoothly to improve the mean air-flow velocity in section.

The fins 2 comprising the partition walls are uniform in thickness and formed integrally in the radial direction between the outside and inside sliding plates 12 and 11 in the predetermined radial range.

Figure 5:
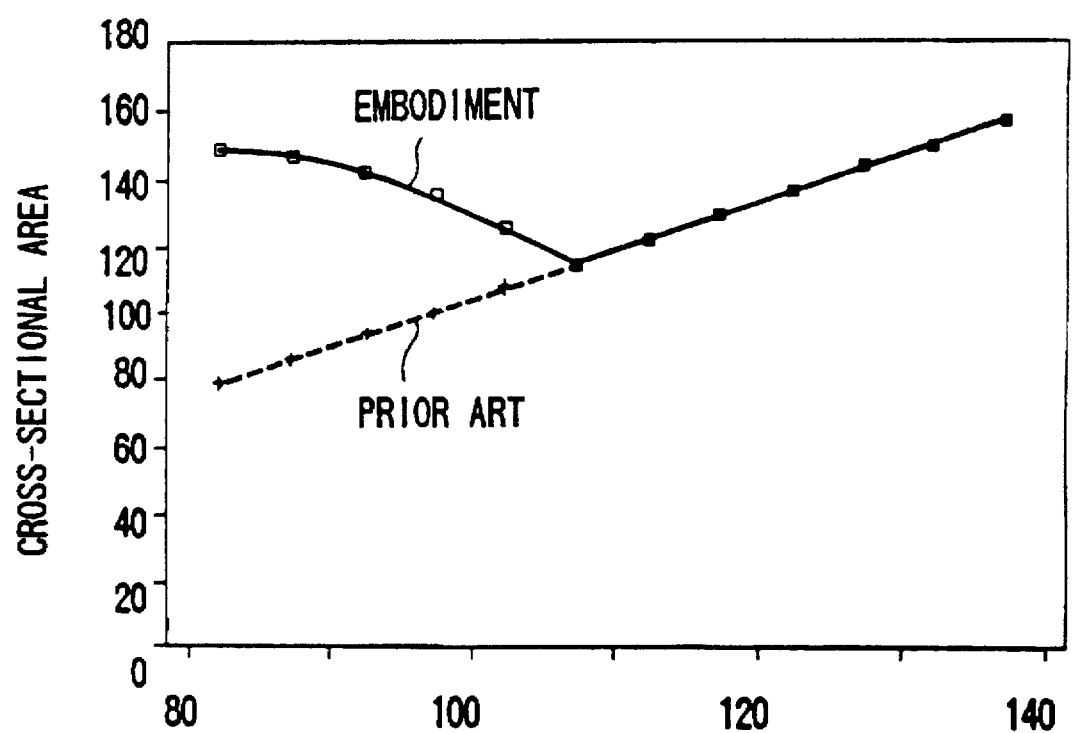
FIG. 5 is a graph showing the sectional area in a ventilation hole according to the first preferred embodiment and the prior art.

The ventilation hole 4 is reduced as the thickness of the inside sliding plate 11 on the inner side is linearly increased outward in the radial direction. The ventilation hole is 15 mm in height at the inlet opening 31, and 8 mm in height at the outlet of the taper portion 5 and the outlet opening 32. Since the fins 2 are formed radially, that is, in the radial direction, the sectional area of the ventilation hole on the inner side becomes the narrowest at the outlet of the taper portion 5 as shown in FIG. 5. However, a change in sectional area of the ventilation hole is lessened in comparison with that of the prior art shown by broken lines in FIG. 5, in which no taper surface is formed as shown in FIG. 17.

Namely, the reduction in area serving as the ratio of the sectional area (115 mm$^2$) at the outlet of the taper portion 5 to the opening sectional area (149 mm$^2$) of the inlet opening 31 is set to approximately 77%. In the rotor having the size of the first embodiment, as long as the reduction in sectional area is 70% or above, it is possible to ensure the flow rate corresponding to the inlet opening area. On the other hand, if the reduction in sectional area is less than 70%, the inflow resistance is increased to make it impossible to obtain the effect of sufficiently improving the flow rate.

The overall operation of the first preferred embodiment will be described in the following.

As shown in FIGS. 1 and 2, the brake disc rotor as the first preferred embodiment described above has the taper portion 5 formed on the radially inner surface portion of the inside sliding plate 11 opposed to the outside sliding plate. Thus, the stream having flown from each inlet opening 31 having the large opening area controls the flow separation at the inner end of the inside sliding plate 11, and flows out of each outlet opening 32 by passing through the ventilation hole 4, which has a small change in sectional area and is defined by the mutually adjacent fins 2 provided radially and the opposed inner surface portions of the outside sliding plate 12 and the inside sliding plate 11 formed with the taper portion 5, and also through the ventilation hole on the outer side, which has no change in opposed interval between the outside and inside sliding plates 12 and 11.

Since the brake disc rotor as the first preferred embodiment having the operation described above has the taper portion 5 formed on the inner side of the inside sliding plate 11 such that the opposed interval between the inside and outside sliding plates 11 and 12 is gradually decreased outward in the radial direction, the opening area of each inlet opening 31 is enlarged to reduce the inflow resistance, while the flow separation at the inner end of the inside sliding plate 11 is controlled, and the change in sectional area of the ventilation hole 4 is lessened. Thus, the brake disc rotor exerts such effects as to increase the flow rate and the mean air-flow velocity and to improve the cooling capacity of the rotor.

Namely, according to the brake disc rotor as the first preferred embodiment, the flow separation on the inner side of the inside sliding plate 11 is controlled, and the inflow resistance is reduced to improve the flow rate of the rotor. In addition, the abrupt increase of the sectional area in the ventilation hole 4 is controlled to improve the air-flow capacity of the rotor, and the mean air-flow velocity is increased to improve the heat transfer coefficient. Further, the difference in thickness of the sliding portion is restrained to a minimum to control the distribution of temperature in the radial direction within the sliding portion. Furthermore, the reduction of rigidity and strength of the connection portion between the rotor and the sliding portion is restrained to a minimum to control the thermal deformation. Moreover, a necessary weight is ensured in a limited space, and the air-flow capacity of the ventilation hole is improved to make the improvement in cooling capacity compatible with the reduction in size of the rotor. Namely, the size of the rotor is reduced to attain the reduction in unsprung total weight including other systems (such as caliper and wheel).

Figure 6:
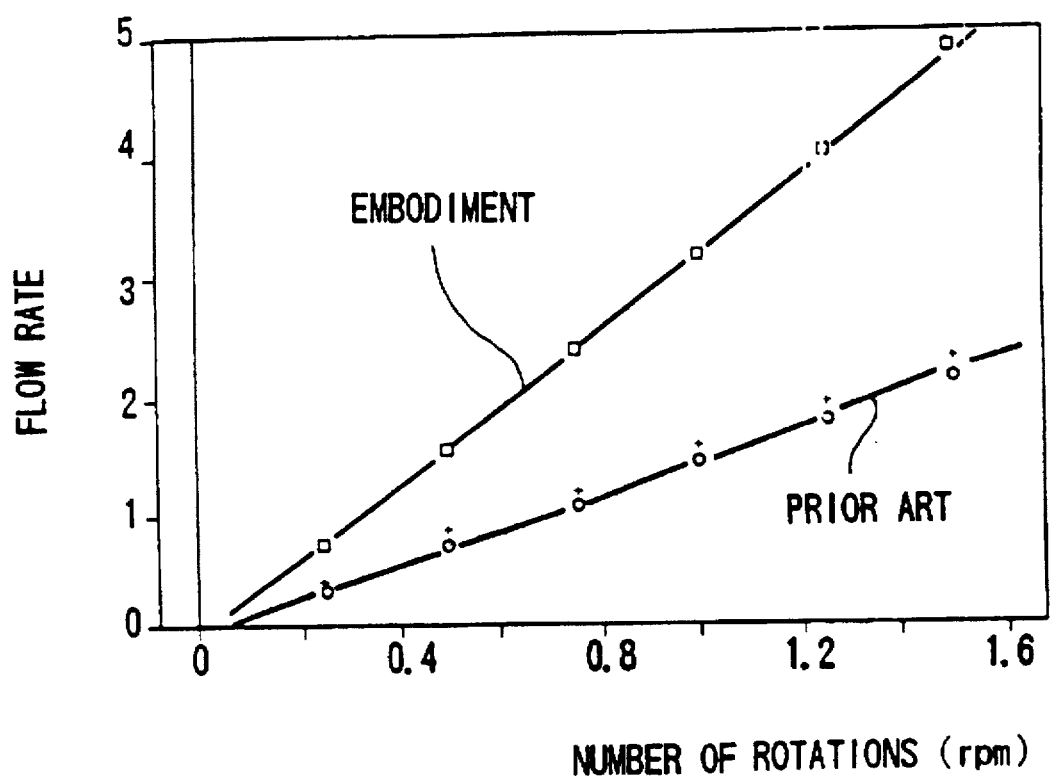
FIG. 6 is a graph showing the performance of flow rate according to the first preferred embodiment and the prior art.

Further, since the brake disc rotor as the first preferred embodiment exerts such effects as to enlarge the opening area of each inlet opening 31 by forming the taper portion 5, and to reduce the loss by allowing the stream to flow into a stagnation area in the ventilation hole and by enlarging the main stream due to the reduction in sectional area in the taper portion, the flow rate is improved by 106 to 132% as shown in FIG. 6, in comparison with the prior art rotor having no taper portion.

Figure 8:
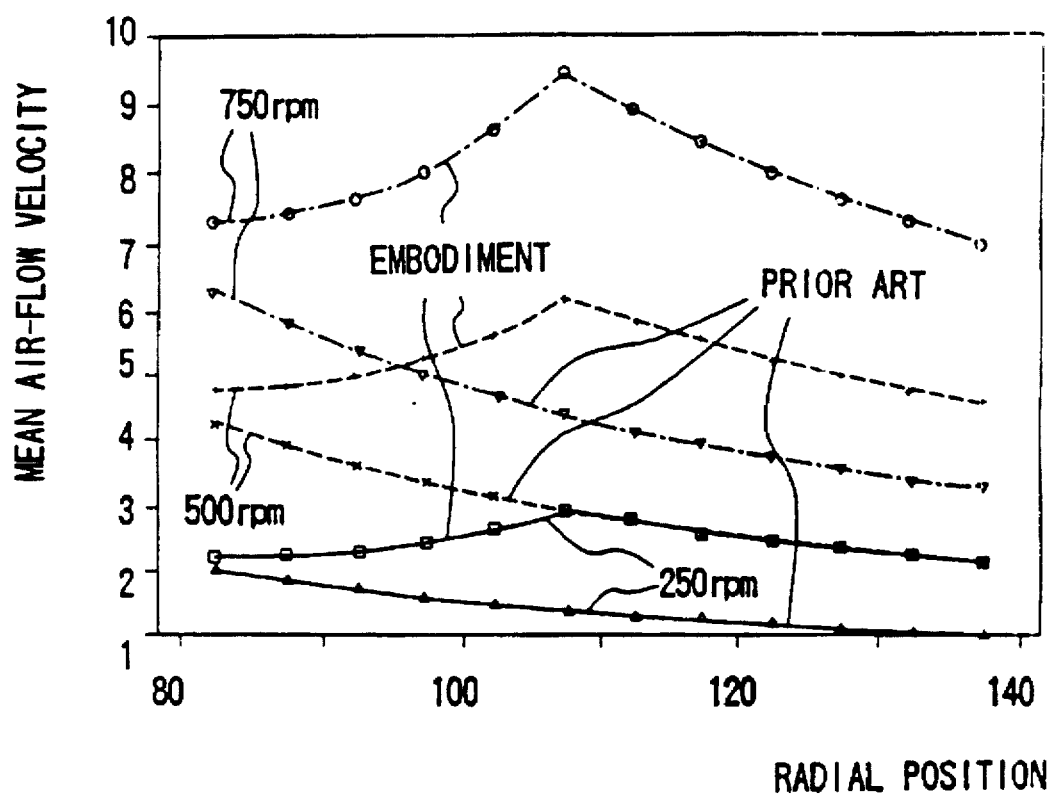
FIG. 8 is a graph showing the mean air-flow velocity in section in case of 250, 500 and 750 rpm according to the first preferred embodiment and the prior art.
Figure 9:
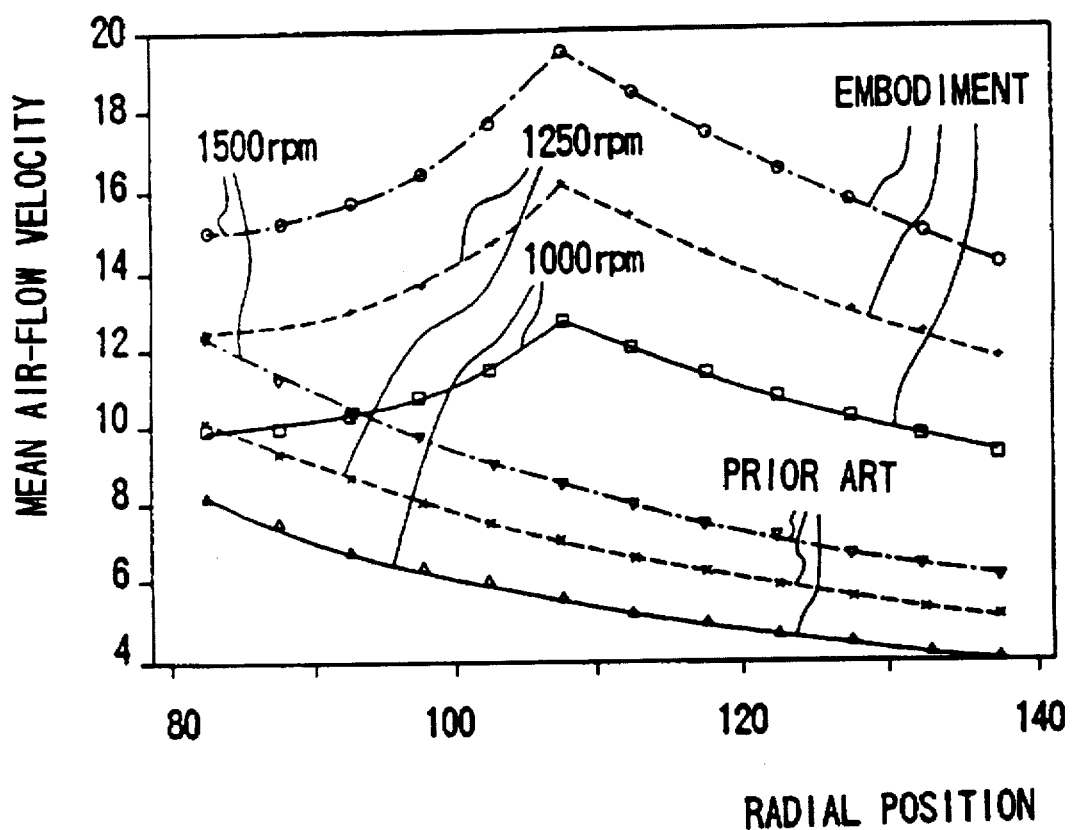
FIG. 9 is a graph showing the mean air-flow velocity in section in case of 1000, 1250 and 1500 rpm according to the first preferred embodiment and the prior art.
Figure 10:
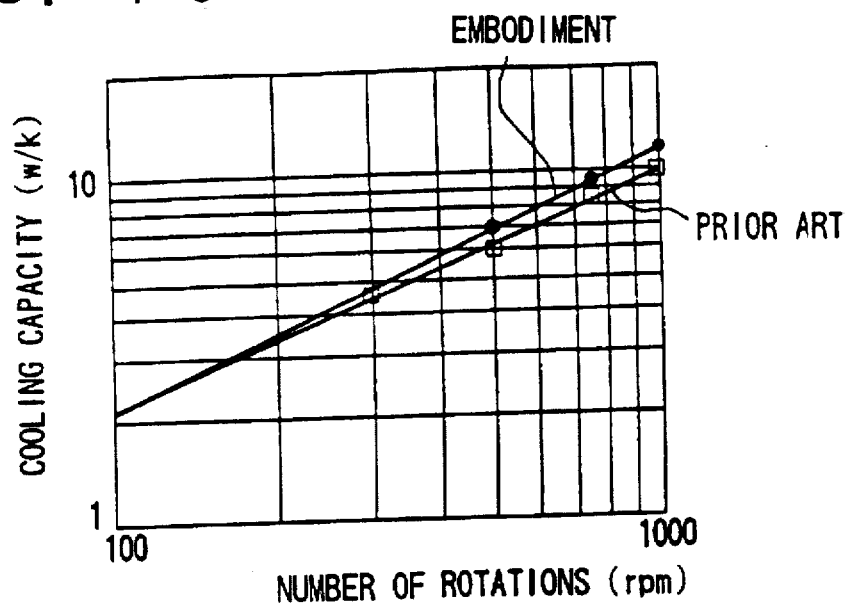
FIG. 10 is a graph showing the cooling capacity of the rotor according to the first preferred embodiment and the prior art.
Figure 11:
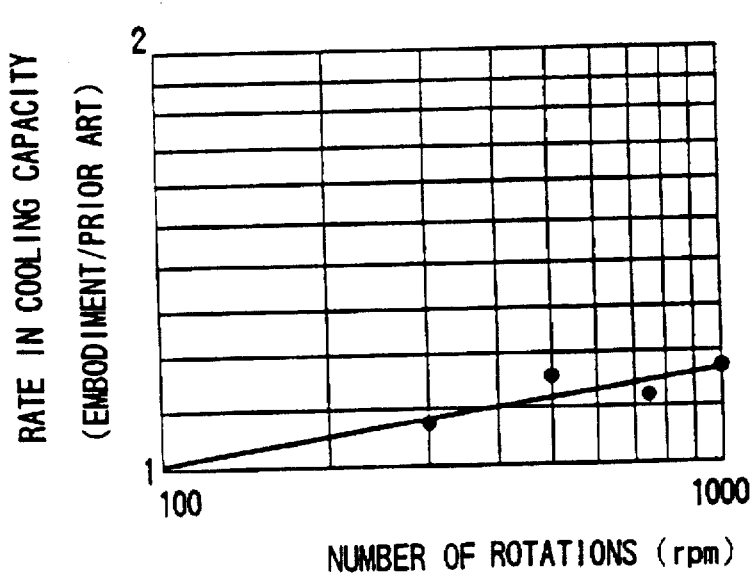
FIG. 11 is a graph showing the rate in cooling capacity of the rotor according to the first preferred embodiment and the prior art.
Figure 12:
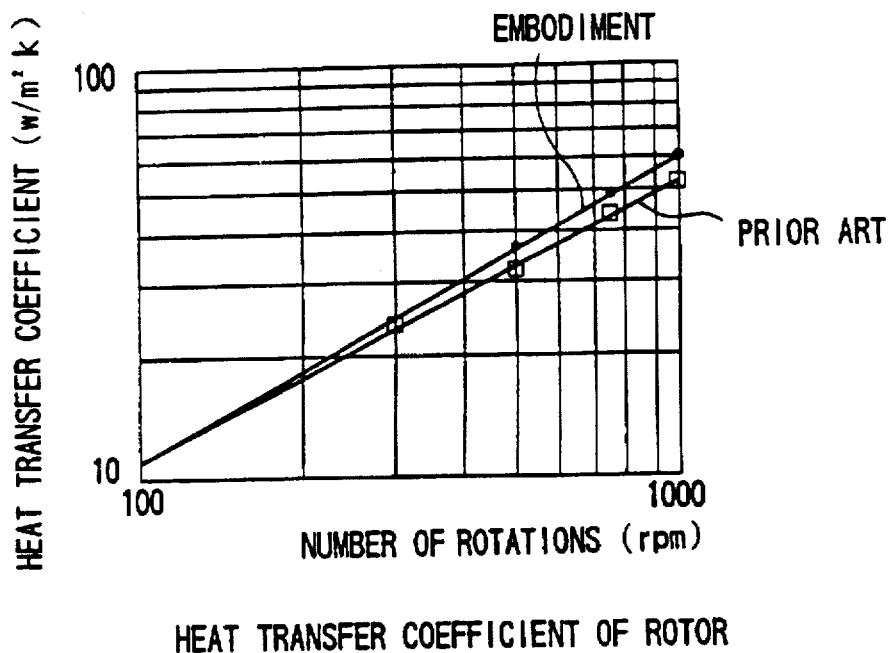
FIG. 12 is a graph showing the heat transfer coefficient of the rotor according to the first preferred embodiment and the prior art.
Figure 13:
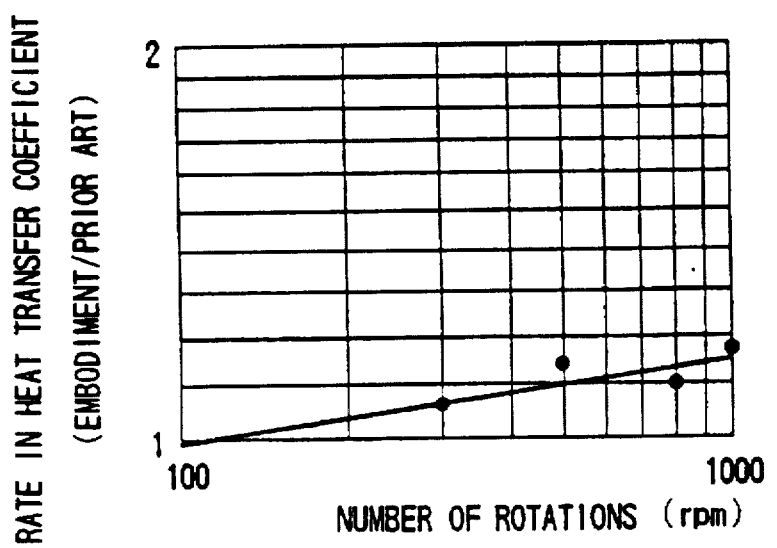
FIG. 13 is a graph showing the rate in heat transfer coefficient of the rotor according to the first preferred embodiment and the prior art.

Further, according to the brake disc rotor as the first preferred embodiment, the mean air-flow velocity is improved by 10 to 23% at the inlet opening 31 of the ventilation hole 4, and also by 106 to 132% at the outlet opening 32 thereof as shown in FIGS. 7 to 9, in comparison with the prior art rotor. The improvement in heat capacity by 78 to 99% is attained in the mean air-flow velocity in sectional area serving as the mean of integration of the sectional area to the whole range of the ventilation hole 4 largely influencing the cooling capacity.

Further, with respect to the shape of the rotor as the first preferred embodiment and that of the prior art rotor, a rotor cooling evaluation test was made to calculate the cooling capacity and the heat transfer coefficient according to the cooling curve representing the change in mean temperature of the sliding portion, assuming that the sliding portion is a system of particles. The results of this test are shown in FIGS. 10 to 13. As shown, in the brake disc rotor as the first preferred embodiment, the heat transfer coefficient of the rotor and the rate in heat transfer coefficient of the rotor are improved by 5 to 16%, and the cooling capacity of the rotor and the rate in cooling capacity of the rotor are improved by 7 to 18%. In case of taking heat balance into consideration, it is conceivable that the heat transfer coefficient in the ventilation hole 4 is improved by approximately 40 to 60%. Incidentally, in the above measurement, the temperature was measured with a brake cooling evaluation device which has been originally developed by the present inventors.

Further, since no taper portion is formed on the outside sliding plate 12, the brake disc rotor as the first preferred embodiment exerts such effects as to eliminate the thermal deformation caused by the reduction of rigidity and strength of the connection portion between the outside sliding plate and the boss portion 13, and to prevent the increase of the distribution of temperature in the radial direction due to the difference in thickness of the outside sliding plate 12.

Further, since the brake disc rotor as the first preferred embodiment has the taper portion 5 formed on the inner side of the inside sliding plate 11, the total weight of the rotor is reduced by 5%, and particularly, the weight of the sliding portion is reduced by 6%. Thus, the increase of temperature due to the reduction of weight, i.e., heat capacity is restrained to a minimum, and a change in weight of the inside sliding plate 11 is lessened. Therefore, the brake disc rotor exerts such an effect as to restrain the distribution of temperature in the thickness direction of the sliding portion to a minimum by restraining the difference in weight and that in heat capacity between the inside and outside sliding plates as low as possible.

Since the cooling capacity is in proportion to a heat dissipation area, it is important to increase the heat dissipation area. According to the first preferred embodiment, since the heat dissipation area is effectively ensured by the taper portion 5 in the limited heat dissipation area to make it possible to widely keep an area having high heat transfer coefficient, it is possible to improve the cooling capacity.

As shown in FIG. 1, since the brake disc rotor 1 as the first preferred embodiment is constituted such that the fins 2 are formed in the radial direction of the rotor and arranged bisymmetrically, brakes of left and right wheels of an automobile can be constituted with the same rotor. Thus, the design and manufacture line can be simplified to exert such effects as to remarkably save the cost and to facilitate the maintenance.

Figure 14:
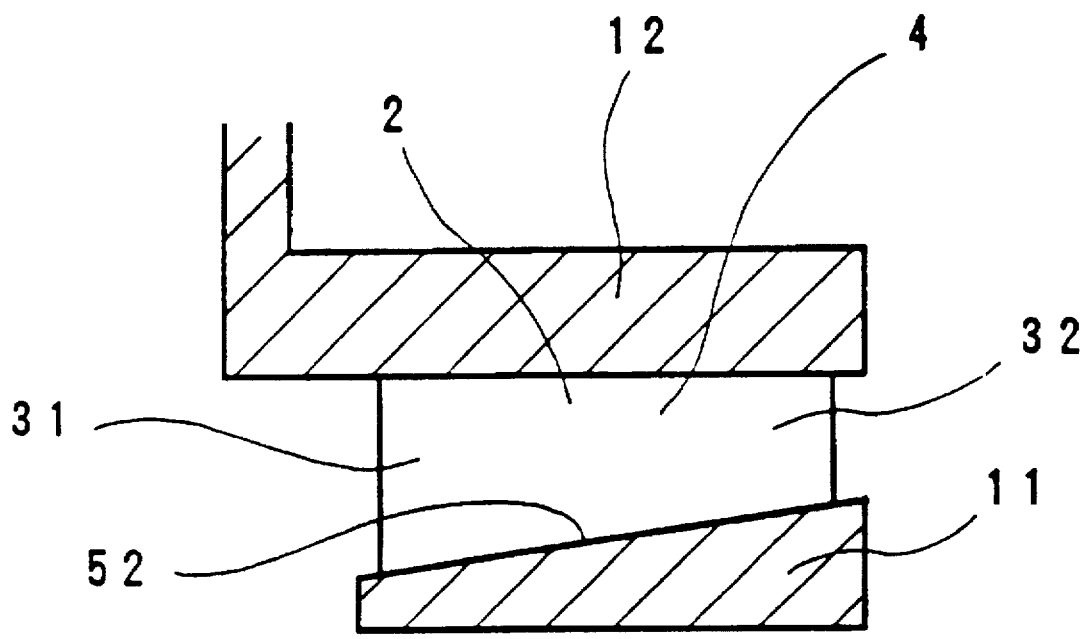
FIG. 14 is a longitudinal sectional view showing an essential portion of a brake disc rotor as a second preferred embodiment of the present invention.

As shown in FIG. 14, a brake disc rotor as a second preferred embodiment comprises a taper portion 52 formed over the whole radial length of the surface of the inside sliding plate 11, instead of the taper portion 5 formed on the inner side of the inside sliding plate 11 of the brake disc rotor 1 as the first preferred embodiment.

Similarly to the first preferred embodiment, the inside sliding plate 11 is provided to face to the outside sliding plate 12 and is 275 mm in outer diameter and 165 mm in inner diameter. Further, the inside sliding plate 11 has the taper portion 52 such that the thickness of the inside sliding plate is increased outward in the radial direction to linearly reduce the whole height of the ventilation hole 4. The taper portion 52 extends over 25 mm in length, i.e. over the length from 82.5 to 107.5 mm in radius corresponding to the whole ventilation hole on the inner side.

The brake disc rotor as the second preferred embodiment described above has the taper portion 52 formed wholly on the surface of the inside sliding plate 11 opposed to the outside sliding plate. Thus, the stream having flown from each large inlet opening 31 controls the flow separation at the inner end of the inside sliding plate 11, and flows out of each outlet opening 32 by passing through the ventilation hole which has a small change in sectional area and is defined by the mutually adjacent fins provided radially and the opposed surfaces of the outside sliding plate 12 and the inside sliding plate 11 wholly formed with the taper portion 52.

Since the brake disc rotor as the second preferred embodiment having the operation described above has the taper portion 52 formed on the whole surface of the inside sliding plate 11 such that the opposed interval between the outside and inside sliding plates is gradually decreased outward in the radial direction, the flow separation at the inner end of the inside sliding plate 11 is controlled, and the area of the ventilation hole 4 in the whole radial length is made approximately uniform even though the mutually adjacent fins 2 are provided in the radial direction. Thus, the brake disc rotor exerts such an effect as to prevent the increase of a pressure resistance and the reduction of a flow rate by preventing the abrupt increase of the sectional area of the ventilation hole 4, in addition to the effects similar to those in the first preferred embodiment.

As shown in FIG. 15, a brake disc rotor as a third preferred embodiment further comprises an inclined portion or a taper portion 53 formed on the radially inner surface portion of the outside sliding plate 12 opposed to the inside sliding plate 11 such that the taper portion 53 is opposed to the taper portion 5 formed on the inner surface portion of the inside sliding plate 11 opposed to the outside sliding plate 12 in the brake disc rotor 1 as the first preferred embodiment.

Similarly to the first preferred embodiment, the inside sliding plate 11 is provided to face to the outside sliding plate 12, and is 275 mm in outer diameter and 165 mm in inner diameter. Further, the inside sliding plate 11 has the taper portion 5 which linearly increases in thickness outward in the radial direction to linearly reduce the height of the ventilation hole 4. The taper portion 5 extends over 25 mm in length i.e. over the length from 82.5 to 107.5 mm in radius corresponding to the range of 45% in the whole ventilation hole on the inner side.

The outside sliding plate 12 is provided integrally with the boss portion 14 having a hole for fixing the wheel WH through the step portion 13 together with the inside sliding plate 11 as shown in FIG. 4. The outside sliding plate 12 is 275 mm in outer diameter and 165 mm in inner diameter, and formed in a same thickness of 10 mm radially outward of the taper portion 53.

The brake disc rotor as the third preferred embodiment described above has the taper portions 5 and 53 respectively formed on the opposed inner surface portions of the inside and outside sliding plates 11 and 12. Thus, the stream having flow from each large inlet opening 31 flows out of each outlet opening 32 by passing through the ventilation hole 4, which has a small change in area and is defined by the mutually adjacent fins 2 provided radially and the opposed inner surface portions of the inside and outside sliding plates 11 and 12 respectively formed with the taper portions 5 and 53, and also through the ventilation hole 4 on the outer side, which has no change in opposed interval between the inside and outside sliding plates 11 and 12.

Since the brake disc rotor as the third preferred embodiment having the operation described above has the taper portions 5 and 53 respectively formed on the inner side of the inside and outside sliding plates 11 and 12 such that the opposed interval between the inside and outside sliding plates is gradually decreased outward in the radial direction, a change in thickness of the taper portions 5 and 53 respectively formed on the inside and outside sliding plates 11 and 12 can be lessened. Thus, the brake disc rotor exerts such an effect as to control the increase of the distribution of temperature in the radial direction due to the difference in thickness of the inside and outside sliding plates 11 and 12, in addition to the effects similar to those in the first preferred embodiment.

Further, when the taper portions are formed on the opposed inner surfaces of the inside and outside sliding plates 11 and 12 like the first and third preferred embodiments, it is preferable that the length of the taper portion is set to be 80% or less of the length of each of the inside and outside sliding plates 11 and 12 from the viewpoint of the improvement in air-flow rate.

It is further preferable that the minimum sectional area (outlet sectional area of taper portion) of the ventilation hole 4 is set to be 50% or more of the opening sectional area of the inlet opening 31 from the viewpoint of the improvement in flow rate.

It is further preferable that the ratio of the inner diameter of each of the inside and outside sliding plates 11 and 12 to the whole length thereof in the radial direction is reduced as small as possible from the viewpoint of improvement in mean air-flow velocity by preventing the increase of the sectional area of the ventilation hole 4. However, if the ratio described above is reduced in the extreme, a change in sectional area at the inlet opening of the ventilation hole 4 is enlarged to increase the pressure resistance. In this case, it becomes hard to obtain the performance of air-flow corresponding to the inlet section. In addition, since an opening area cannot be widely kept due to the relation between the inlet sectional area and the minimum sectional area, it becomes hard to obtain the effect of improving the flow rate.

The preferred embodiments described above are illustrative and not restrictive, and it is to be understood that other embodiments and modifications are possible without departing from the technical concept of the invention which will be recognized by those skilled in the art on the basis of the claims, the description of the invention and the drawings.

Figure 16:
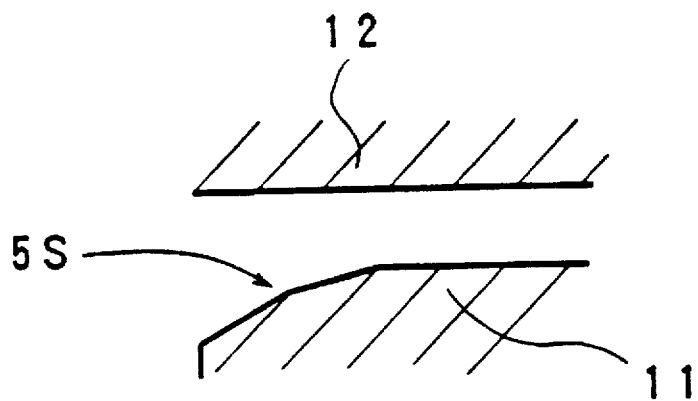
FIG. 16(a) is a longitudinal sectional view showing a modification of a taper portion.
FIG. 16(b) is a longitudinal sectional view showing another modification of a taper portion.
FIG. 16(c) is a longitudinal sectional view showing still another modification of a taper portion.
Figure 16:
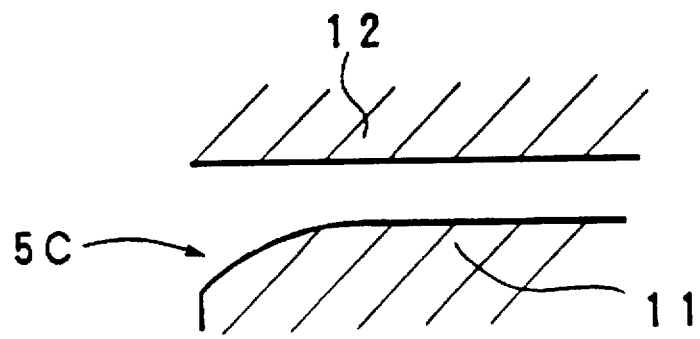
Figure 16:
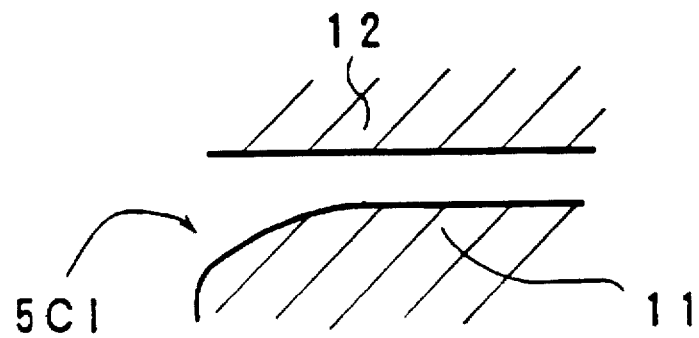
Figure 19:
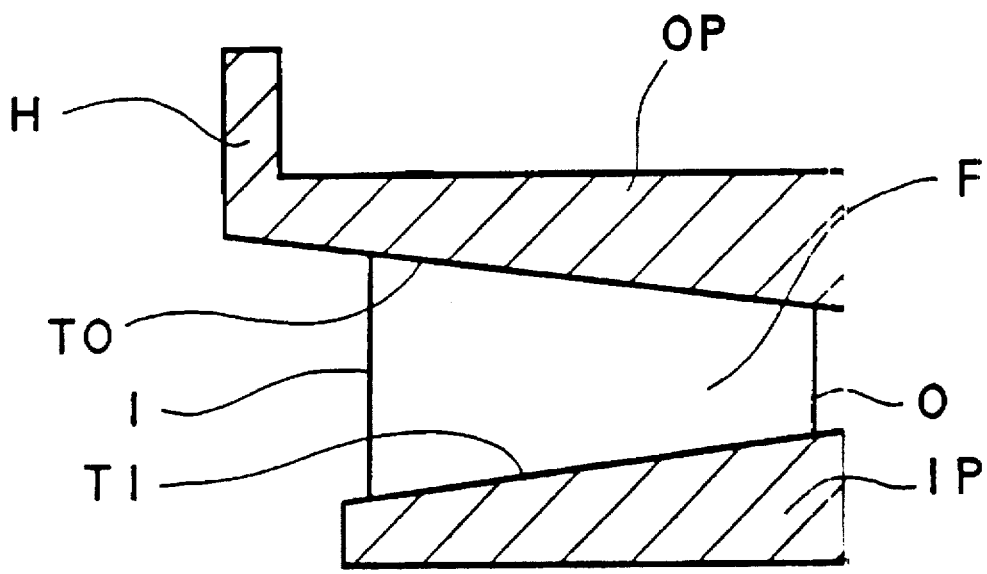
FIG. 19 is a longitudinal sectional view showing an essential portion of a brake disc rotor as a third prior art.
Figure 20:
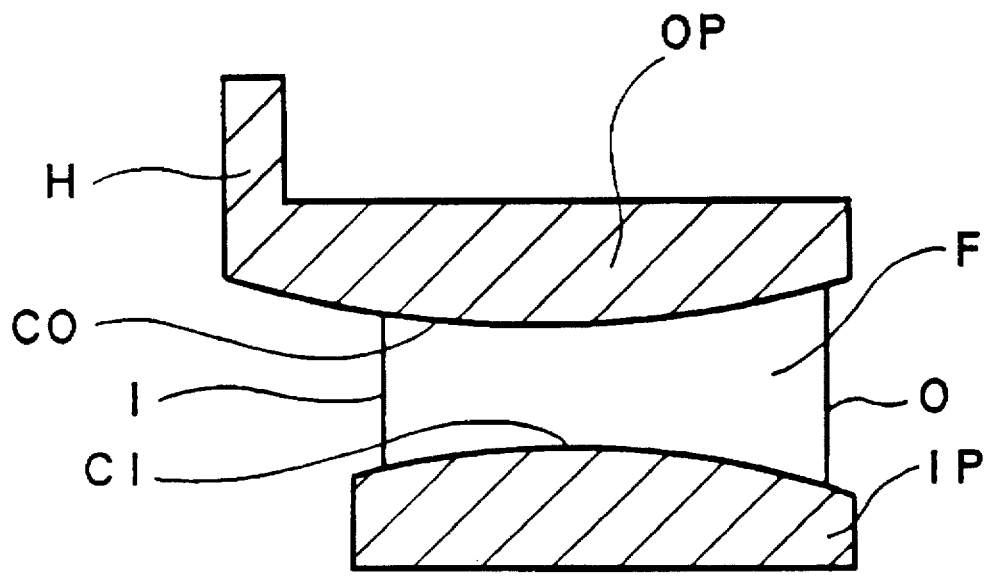
FIG. 20 is a longitudinal sectional view showing an essential portion of a brake disc rotor as a fourth prior art.

In the preferred embodiments described above, a description has been given of a case where the inclined portion is constituted by the linear taper portion, and it is to be understood that the inclined portion of the present invention should not be limited to the linear taper portion. For instance, as shown in FIGS. 16(a), 16(b), and 16(c), the taper portion may include a multi-stage taper portion 5C FIG. 16(a), or a curved inner surface 5C FIG. 16(b), or a curved inner surface 5CI having an inner curved edge FIG. 16(c), or any other shape may take at need.

What is claimed is:

1. a brake disc rotor comprising:
   a pair of opposed inside and outside disc-shaped sliding plates provided axially inside and outside on said brake disc rotor, said inside and outside sliding plates each having inside and outside annular flat surfaces, said inside flat surfaces facing one another and being separated from each other in an axial direction;
   a plurality of partition walls radially provided between said inside and outside sliding plates;
   a plurality of passages radially formed between said plurality of partition walls and between opposed said inside annular flat surfaces of said inside and outside sliding plates and at right angles with respect to the axial direction thereof;

a plurality of inlet and outlet openings communicating with said plurality of passages and opening inward and outward in a radial direction of said sliding plates;

said inside and outside surfaces of said outside sliding plate having said annular flat surfaces formed entirely in parallel such that said outside sliding plate has a constant thickness as a whole; and an inclined portion formed on a radial inner part of said inside annular flat surface of said inside sliding plate opposed to said outside sliding plate such that a distance between said inside annular flat surfaces of said inside and outside sliding plates is gradually decreased in a radial outward direction at a radial inner part of said passage, so as to enlarge the cross-sectional area at said radial inner part of said passage and reduce a flow separation caused by change of flow directions of the inflow at a radial inner end of said passage, thereby decreasing inflow resistances of an inflow flowing into the radial inner part of said passage through said inlet opening; and increasing a flow rate and a mean airflow velocity to improve the cooling capacity of the rotor.

2. A brake disc rotor according to claim 1, wherein said inside annular flat surface of said inside sliding plate has radially inner and outer surface portions, and said inclined portion comprises a taper portion formed on at least the radial inner surface portion of said inside annular flat surface on said inside sliding plate so that a thickness of said inside sliding plate is gradually increased in the radially outward direction.

3. A brake disc rotor according to claim 2 wherein a length of said taper portion is set to be 80% or less of a whole radial length of said inside sliding plate.

4. A brake disc rotor according to claim 2, wherein a sectional area of said plurality of passages at a radially outward end of said taper portion is set to be 50% or more of an opening area of said inlet opening.

5. A brake disc rotor according to claim 4 wherein an angle of said inclined portion formed on said radial inner part of said inside sliding plate is defined so that a cross-sectional area at said radial inner part of said passage is gradually decreased in a radial outward direction and is minimum at a radial outward end of said inclined portion.

6. A brake disc rotor according to claim 2, wherein a length of said taper portion is set to be 45% of a whole radial length of said inside sliding plate.

7. A brake disc rotor according to claim 6, wherein a sectional area of said plurality of passages at a radially outward end of said taper portion is set to be 77% of an opening area of said inlet opening.

8. A brake disc rotor according to claim 2, wherein an inclined angle of said inclined portion formed on said radial inner part thereof is larger than that of said outer inclined portion formed on said radial outer part thereof.

9. A brake disc rotor according to claim 1, wherein said inside and outside sliding plates have radial outer parts on said inside annular flat surfaces, and a distance between the opposed radial outer parts of said inside annular flat surfaces on said inside and outside sliding plates is approximately constant.

10. A brake disc rotor according to claim 9, wherein said inclined portion comprises at least two taper portions formed on at least the inner surface portions of said inside sliding plate so that a thickness of said inside sliding plate is gradually increased in the radially outward direction.

11. A brake disc rotor according to claim 10, wherein said at least two taper portions comprise first and second taper portions, and an inclined angle of said first taper portion is larger than an inclined angle of said second taper portion, said first taper portion being positioned at a radially inner portion than said second taper portion.

12. A brake disc rotor according to claim 9, wherein said inclined portion comprises a curved portion formed on at least the inner surface portions of said inside sliding plate so that a thickness of said inside sliding plate is gradually increased in the radially outward direction.

13. A brake disc rotor according to claim 12, further comprising:

a curved portion formed on the inner surface portion of said outside sliding plate opposed to said inside sliding plate so that a thickness of said outside sliding plate is gradually increased in the radially outward direction.

14. A brake disc rotor according to claim 9, wherein an angle of said inclined portion formed on said radial inner part of said inside sliding plate is defined so that a cross-sectional area at said radial inner part of said passage is decreased in a radial outward direction and a cross-sectional area at said radial outer part of said passage is increased in the radial outward direction so as to reduce the flow separation and the stagnation area by allowing the stream to flow into a stagnation area in said passage.

15. A brake disc rotor according to claim 1, further comprising an outer inclined portion formed on a radial outer part of said inside annular flat surface of said inside sliding plate.

16. A brake disc rotor according to claim 15, wherein said inner inclined portion comprises a taper portion formed on said radial inner part of said inside annular flat surface of said inside sliding plate, so as to allow the stream to flow into a stagnation area in the ventilation hole and to enlarge a main stream due to the reduction in sectional area at said inner inclined portion.

17. A brake disc rotor according to claim 1, further comprising:

a plurality of connecting openings formed in said plurality of partition walls to permit communication between mutually adjacent passages through the partition walls.

18. A brake disc rotor according to claim 1, wherein each partition wall has same length in the radial direction thereof.

19. A brake disc rotor according to claim 18, wherein said partition wall comprises a straight partition wall provided in the radial direction of said inside and outside sliding plates.

20. A brake disc rotor comprising:

a pair of opposed inside and outside disc-shaped sliding plates provided axially inside and outside on said brake disc rotor, said inside and outside sliding plates each having inside and outside annular flat surfaces, said inside flat surfaces facing one another and being separated from each other in an axial direction;

a plurality of partition walls radially provided between said inside and outside sliding plates;

a plurality of passages radially formed between said plurality of partition walls and between opposed said inside annular flat surfaces of said inside and outside sliding plates and at right angles with respect to the axial direction thereof;

a plurality of inlet and outlet openings communicating with said plurality of passages and opening inward and outward in a radial direction of said sliding plates;

a taper portion having a straight inclined wall formed on at least a radial inner part of said inside annular flat surface on said inside sliding plate, a taper portion having a straight inclined wall formed on at least a radial inner part of said inside annular flat surface on said outside sliding plate, wherein a distance between said taper portions of said inside and outside sliding plates is gradually decreased in a radial outward direction at a radial inner part of said passage, so as to enlarge the cross sectional area at said radial inner part of said passage and reduce a flow separation caused by change of flow directions of the inflow at a radial inner end of said passage, thereby decreasing inflow resistance of an inflow flowing into the radial inner part of said passage through said inlet opening, and increasing a flow rate and a mean airflow velocity to improve the cooling capacity of the rotor, and a distance between radial outer parts of said inside annular flat surfaces of said inside and outside sliding plates is approximately constant in the radial direction thereof; and said inlet openings formed at right angles with respect to the axial direction of said sliding plates.

21. A brake disc rotor according to claim 20, wherein a length of said taper portion of said inside sliding plate is set to be 45% of a whole radial length of said inside sliding plate.

22. A brake disc rotor according to claim 21, wherein a radially outward end of said taper portion on said inside sliding plate is positioned at a radially outer portion with respect to a radially outward end of said taper portion on said outside sliding plate.

23. A brake disc rotor according to claim 20, wherein a radially outward end of said taper portion on said inside sliding plate is positioned at a radially outer portion with respect to a radially outward end of said taper portion on said outside sliding plate.

* * * * *